United States Patent [19]

Bellavia, Jr. et al.

[11] 4,219,203
[45] Aug. 26, 1980

[54] THERMAL BARRIER PRESSURE SEAL

[76] Inventors: Alan M. Lovelace, Administrator of the National Aeronautics and Space Administration, with respect to an invention of John Bellavia, Jr., LaPalma; John O. Kane, Long Beach, both of Calif.

[21] Appl. No.: 974,472

[22] Filed: Dec. 29, 1978

[51] Int. Cl.³ .............................................. F16U 15/02
[52] U.S. Cl. .................................... 277/181; 277/229
[58] Field of Search ............ 277/229, 230, 181, 167.5, 277/183

[56] References Cited
U.S. PATENT DOCUMENTS

| | | | |
|---|---|---|---|
| 3,020,185 | 2/1962 | Moffitt et al. | 277/181 |
| 3,578,764 | 5/1971 | Nunnally | 277/230 |
| 3,934,889 | 1/1976 | Smith | 277/229 |

Primary Examiner—Robert I. Smith
Attorney, Agent, or Firm—Carl O. McClenny; John R. Manning; Marvin F. Matthews

[57] ABSTRACT

Apparatus for providing thermal and pressure sealing in an elongated space of varying width between adjacent surfaces of first and second members mounted for at least limited lateral movement therebetween. The apparatus may comprise: a first elongated support member attached to one of the adjacent surfaces; a second elongated support member attached to the other of the adjacent surfaces; and an elongated seal member sandwiched between the first and second support members. In its non-deformed state, the elongated seal member may be substantially cylindrical but capable of deformation to accommodate limited lateral movement between the adjacent surfaces and varying widths of the space therebetween.

2 Claims, 8 Drawing Figures

THERMAL BARRIER PRESSURE SEAL

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 45 U.S.C. 2457).

BACKGROUND OF THE INVENTION

1. Field of the Invention

The present invention pertains to thermal barriers and pressure seals. Specifically, it pertains to apparatus suitable for providing both pressure sealing and thermal isolation. Still more specifically, the present invention pertains to a combination thermal barrier and pressure seal suitable for use in spacecraft.

2. Brief Description of the Prior Art

In conventional aircraft there are several movable control surfaces, such as ailerons, elevators, rudders, trim tabs and the like. To prevent undue turbulence, reduction in control and fuel efficiency, it is desirable to provide proper pressure sealing at the junctions between such control surfaces and the adjacent structure of the aircraft. Examples of such sealing apparatus may be seen in U.S. Pat. Nos. 2,368,702 and 2,381,350.

Some aircraft are provided with adjustable wings which at least partially retract into the fuselage under certain conditions of flight. Sealing of the fuselage recess is necessary to prevent undesirable aerodynamic effects, particularly in high-speed aircraft. Various flexible and sometimes partially inflatable seals have been developed for this purpose. Examples may be seen in U.S. Pat. Nos. 3,480,237; 3,797,784; 3,987,985; and 4,029,272.

In designing spacecraft for flights to outerspace, it is, of course, necessary to provide proper pressure sealing at the junction between control surfaces and the adjoining spacecraft structure to prevent harmful aerodynamic effects. In addition, consideration must be given to the extremely high temperatures encountered in space flight where temperatures in excess of 1,000° C. are not uncommon. While the surface of the spacecraft may be protected against extreme temperatures, it is not as easy to provide temperature protection for the recessed areas normally associated with the various aerodynamic control elements of the spacecraft. Some of these areas require both pressure and thermal sealing and if a sealing assembly could be designed to satisfy both requirements, it would be highly desirable. However, prior to the present invention, such a combination pressure and thermal seal suitable for such sealing in a variable space has not been found.

SUMMARY OF THE PRESENT INVENTION

In the present invention, apparatus is provided which serves both as a pressure seal and a thermal barrier specifically for use in recessed areas of a spacecraft. The seal features the ability to roll, compress and expand to maintain a pressuretight thermal seal for preventing entry of hot gases into spaces between adjacent members of the spacecraft.

The seal assembly of the present invention may comprise first and second elongated support members attached to adjacent surfaces of the spacecraft between which is an elongated space of varying width. Sandwiched between the support members is an elongated seal member which in its non-deformed state is substantially cylindrical but which is capable of deformation to accommodate varying widths of the space and limited lateral movement between the adjacent surfaces of the spacecraft. The support members are preferably of materials having relatively low thermal conductivity. The elongated seal member preferably comprises an inner core of relatively low thermal conductivity and an outer cover of relatively high pressure resistance. Preferably a pair of such seal assemblies are disposed at opposite edges of the elongated space between the adjacent surfaces of the spacecraft, leaving a thermally and pressure isolated void therebetween.

Thus, the seal of the present invention provides, for the first time, a seal which performs the dual function of providing a pressure seal and a thermal barrier in a variable space for the extreme pressure and heat conditions encountered in space flight or in other environments in which the seal may find use. While the seal assembly of the present invention offers the foregoing advantages and others to be pointed out hereafter, still others will be apparent from reading the specification which follows in conjunction with the accompanying drawings.

DESCRIPTION OF THE PREFERRED EMBODIMENT

Figure 1:
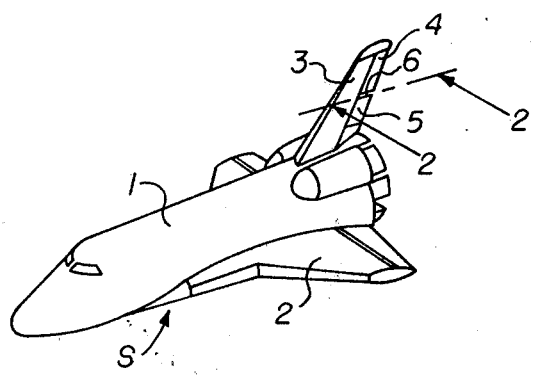
FIG. 1 is a pictorial illustration of a spacecraft or orbiter having a rudder/speed brake, the control surface of which is split into upper and lower sections, between which is disposed a thermal pressure seal according to a preferred embodiment of the invention.

Referring first to FIG. 1, there is illustrated a spacecraft or orbiter S having a fuselage 1, wings 2 and a vertical stabilizer 3. The vertical stabilizer 3 is provided with control surfaces in the form of upper and lower rudder/speed brakes 4 and 5, respectively. The upper and lower rudder/speed brakes are separated by a gap or space 6 thus allowing relative movement therebetween.

Figure 2:
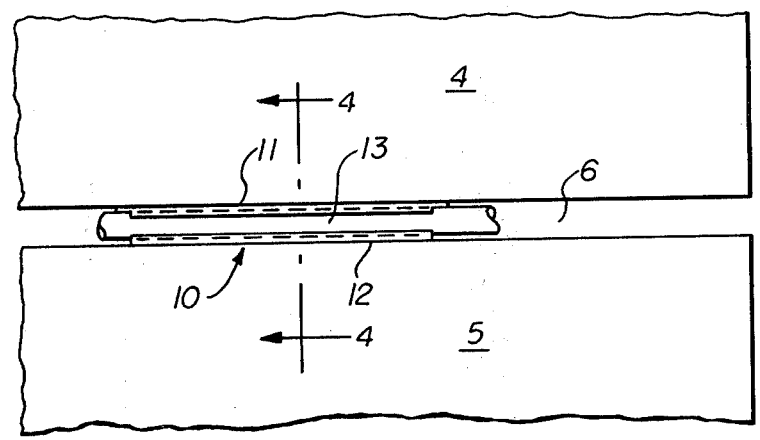
FIG. 2. is a partial elevation view of the upper and lower rudder/speed brakes of the spacecraft of FIG. 1, a portion of which has been removed for better understanding, showing seal apparatus therebetween according to a preferred embodiment of the invention.

Referring now also to FIG. 2, which is a partial elevational view of the rudder/speed brakes 4 and 5, there is shown a seal assembly 10 disposed in the gap or space 6. The seal assembly 10 would run the entire length of the gap 6 along the open side thereof and an identical seal assembly would be disposed in the opposite open side thereof.

Figure 3:
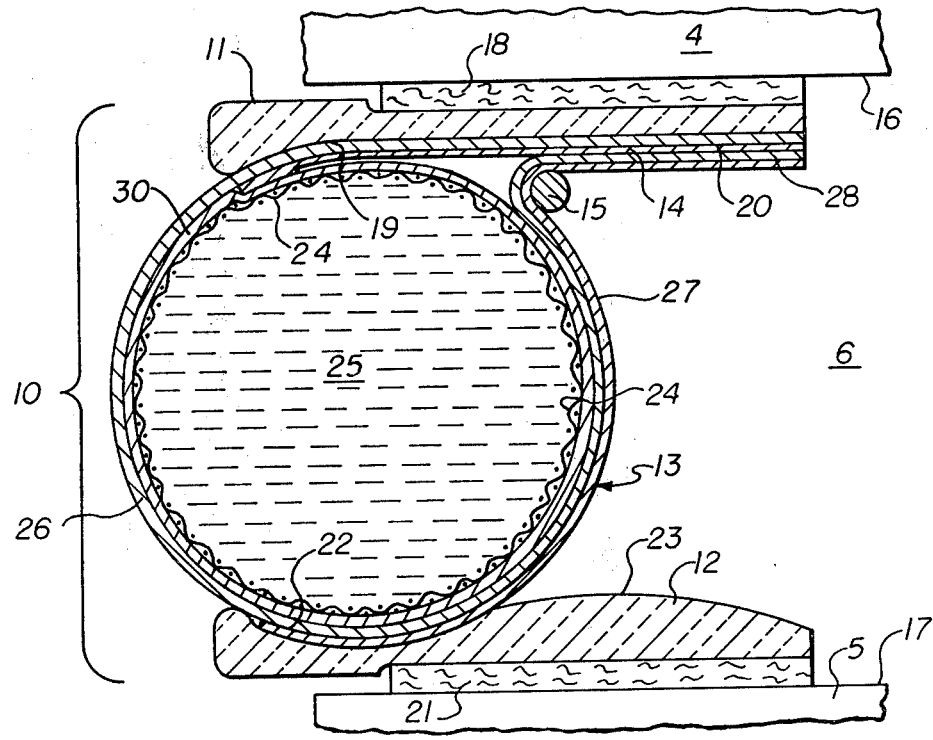
FIG. 3 is a cross sectional view of a seal assembly, according to a preferred embodiment of the invention, illustrating the assembly and composition of the various components thereof.

Referring now also to FIG. 3, the seal assembly 10 is made up of five major components, upper and lower support members 11 and 12, respectively, seal member 13, stiffener 14 and tension rod 15. As illustrated in FIG. 3, the seal assembly 10 is disposed between the adjacent and facing surfaces 16 and 17 of upper and lower rudder/speed brake members 4 and 5, respectively. The seal assembly is disposed along one open side of the gap or space 6 and a similar seal assembly (not shown) would be disposed at the opposite side of the gap or space 6.

The upper support member 11 is essentially flat along its upper or outer face but is provided with a slight recess in which is bonded a strain isolator pad 18 which is in turn bonded to the rudder/speed brake surface 16. The isolator pad 18 may be made from NOMEX felt or some other material suitable for such bonding. Thus, the support member 11 is firmly attached to the upper rudder/speed brake 4. The support member 11 is preferably of a material of relatively low thermal conductivity such as glass ceramic. Other materials, such as glass bonded mica, carbon graphite, pyrolytic graphite and silicon nitride, may be used. It may be machined on its inner face to provide a concave curved surface 19 and a flat surface 20.

The lower support member 12 is also preferably of a low thermal conductive material. Likewise, its lower or outer face is essentially flat but provided with a recess in which is bonded a strain isolator pad 21. The isolator pad 21 is in turn bonded to lower rudder/speed brake surface 17, thus firmly attaching the lower support member 12 thereto. The inner face of the lower support member 12 is machined in a reverse curve to provide both a concave surface 22 and a convex surface 23.

The seal member 13 which is sandwiched between the upper and lower support members 11 and 12 comprises an inner core of relatively low thermal conductive material. This core may be formed by a tube of knitted metallic wire (such as in conel) 24 filled with alumina silica batting 25 (other suitable materials are glass fiber batting or quartz fiber) and with ceramic fiber sleeving 30 braided snuggly over the knitted metallic wire. Surrounding the core is an outer covering of ceramic or glass fabric 26, at least a portion of which is coated with a pressure sealing material 27 such as RTV. Fabric 26 may also be asbestos, quartz, alumina-boria-silica or high silica (fiberglass).

The outer covering, which is comprised of the ceramic fabric 26 and pressure sealing coating 27 may be formed in a composite sheet and wrapped around the core but having ends which extend together to form an elongated flap portion 28, one side of which is bonded to the upper support member 11. Thus, the seal member 13 is attached to the upper support member 11 but simply rests or nests against the lower support member 12. The stiffener 14, which may be made of a metallic material such as iconel, is attached to the inner surface of the outer covering 26 and extends substantially tangentially from the periphery thereof to form a portion of the flap 28.

Disposed along the base of the flap portion 28 on the opposite side thereof from the upper support member 11 is the tensioning rod 15 which is attached at its opposite ends in any suitable manner. Enough tension is placed on the rod 15 to hold the flap 28 and the seal member 13 essentially in the position shown in FIG. 3. The rod 15 may be made of any suitable material; RTV silicone, glass rope, ceramic fiber rope, asbestos fiber rope, metallic wire with braided fabric sleeve covering being examples. It may also be bonded to the adjacent covering 26, 27.

The disposition of the components in FIG. 3 is for illustrative purposes only. When installed for use, as will be more fully shown hereafter, the upper and lower support members 11 and 12 would be closer together. For purposes of illustration, they are shown far enough apart to show the seal member 13 in its cylindrical nondeformed condition. As will be shown hereafter, the seal member 13 is capable of deformation to accommodate varying widths of the space 6 and limited lateral movement or deflection between surfaces 16 and 17.

Referring now to FIGS. 4–8, the seal assembly 10 and a corresponding seal assembly 110 at the opposite side of the space 6 will be shown in more realistic dispositions for varying degrees of widths of the space 6 and varying degrees of relative lateral movement or deflection between the surfaces 16 and 17. For purposes of discussion, the corresponding components of seal assembly 110 will be referenced with the same number as the seal assembly 10 plus 100. For example, the upper support member of seal assembly 110 which corresponds with upper support member 11 will be referenced 111.

Figure 4:
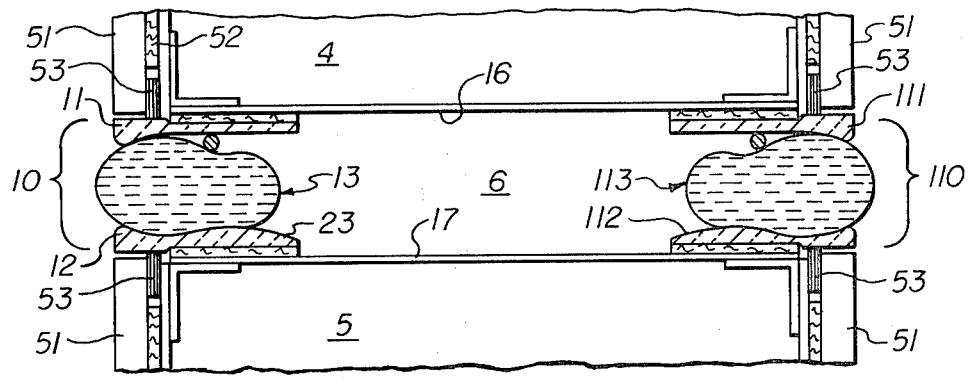
FIG. 4 is a partially sectioned view of the upper and lower rudder/speed brakes of the spacecraft, taken along line 4—4 of FIG. 2, showing the disposition of the sealing apparatus therebetween, according to a preferred embodiment of the invention, in which there is nominal space therebetween and no deflection or relative lateral movement therebetween.

FIG. 4 illustrates a condition in which the space 6 is of a nominal width and in which there is no lateral movement or deflection between the surfaces 16 and 17 of the upper and lower rudder/speed brakes 4 and 5, respectively. Although it forms no part of the present invention, it perhaps should be mentioned that the surfaces of the rudder/speed brakes which are exposed to the space environment may be covered with a material of low thermal conductivity such as ceramic tile 51. Underlying the ceramic tile 51 is a layer of material 52 suitable for proper bonding base for the tile 51. The bonding base material 52 is attached to the underlying structure of the upper and lower rudder/speed brakes 4 and 5. A strip or bar of suitable filler material 53 may be included to provide a bridge between the supports 11, 12, 111, 112 and tile 51.

It will be noted that in the nominal gap condition of FIG. 4, the inner core of the seal members 13 and 113 is compressed between their respective support members 11, 12, and 111, 112. The flexible outer covering of the seal members 13 and 113 allows such deformation so that the seal members snugly engage the concave surface of the first or upper support members 11 and 111 and the concave, convex surfaces of the second or lower support members 12 and 112. Thus, a tight pressure seal and thermal barrier is provided at both sides of the elongated space 6 leaving a void which is isolated from the pressure and temperature environment surrounding the rudder/speed brakes 4 and 5.

Figure 5:
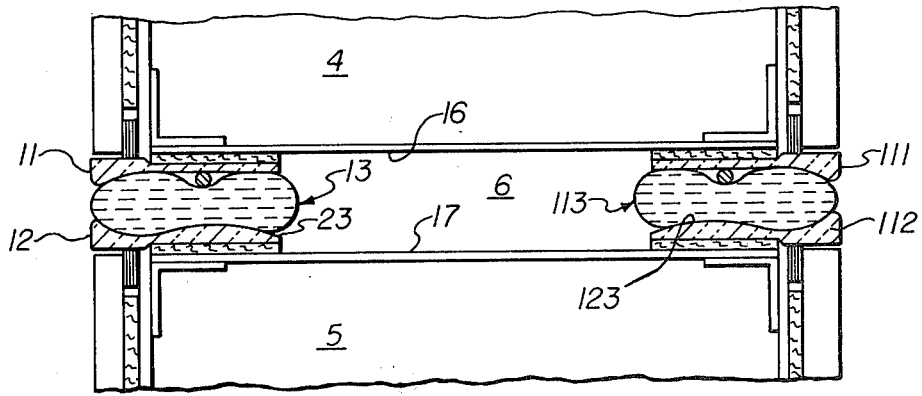
FIG. 5 is a partially sectioned view, similar to FIG. 4, but illustrating the disposition of the seal apparatus where there is a minimum gap between adjacent surfaces of the upper and lower rudder/speed brakes but no relative lateral deflection therebetween.

In FIG. 5, there is illustrated a condition in which the gap 6 is contracted to a minimum expected width. In such condition, the seal members 13 and 113 are further compressed or flattened but still providing the desired pressure and thermal sealing.

Figure 6:
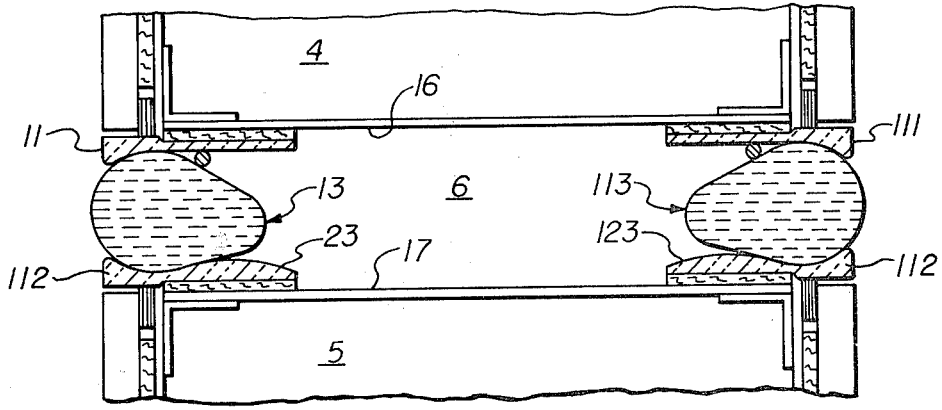
FIG. 6 is a partially sectioned view, similar to FIGS. 4 and 5, but illustrating the disposition of the seal apparatus when there is a maximum gap between the adjacent upper and lower rudder/speed brake surfaces but no relative lateral deflection therebetween.

FIG. 6 represents a condition in which the width of gap 6 is expanded to a maximum expected amount, but where there is still no appreciable deflection or lateral movement between the surfaces 16 and 17. In this condition, the seals 13 and 113 are still deformed or compressed from the non-deformed state shown in FIG. 3 and still sealingly engage the concave surfaces of support members 11, 12 and 111, 112. However, it will be noted that the convex surface 23 and 123 are no longer fully engaged.

Figure 7:
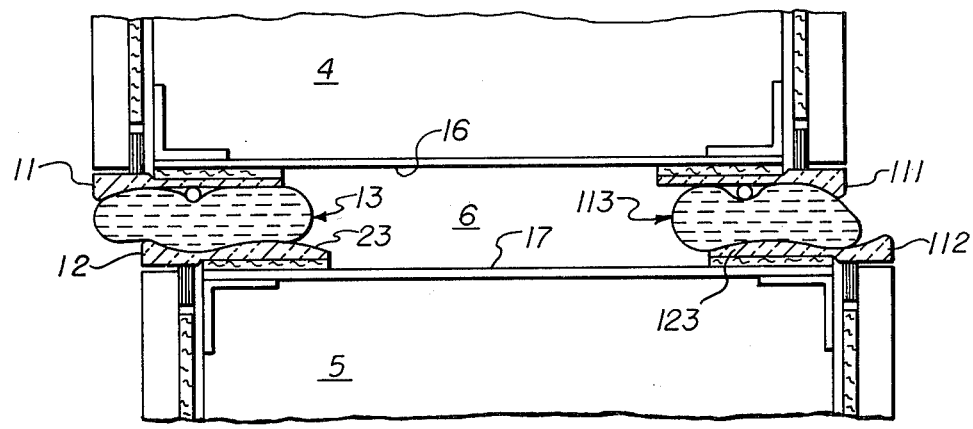
FIG. 7 is a partially sectioned view, similar to FIG. 5, in which there is a minimum gap between the adjacent upper and lower rudder/speed brake surfaces but where there is also relative lateral deflection or displacement therebetween.

FIG. 7 represents a condition in which the width of space 6 is a minimum and in which there is relative deflection or lateral movement between the surfaces 16 and 17. As can be seen, the seal members 13 and 113 still provide sealing engagement with the respective support members 11, 12 and 111, 112. It will be noted that the seal member 13 fully engages the concave surfaces of support member 11 and 12 and at least partially engages the convex surface of support member 12. The seal member 113 fully engages the concave surface of support member 111, fully engages the convex surface of support member 112 and partially engages the concave surface of support member 112.

Figure 8:
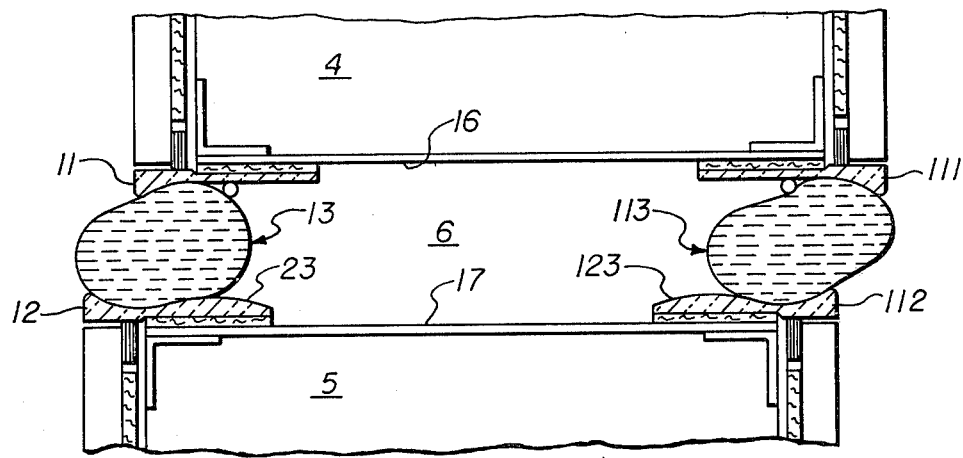
FIG. 8 is a partially sectioned view, similar to FIG. 6, in which there is a maximum gap between the adjacent upper and lower rudder/speed brake surfaces but illustrating lateral deflection or displacement therebetween as well.

Referring finally to FIG. 8, there is shown a condition in which the gap 6 is of maximum width and in which there is relative deflection or lateral movement between surfaces 16 and 17 but in the opposite direction of FIG. 7. Seal member 13 is deformed to fully engage the concave surfaces of support members 11 and 12 and to partially engage the convex surface of support member 12. The opposite seal member 113 fully engages the concave surfaces of support members 111 and 112 and hardly engages the convex surface of support member 112 at all. Still a highly effective pressure and thermal seal is provided to isolate the void area or space 6 therebetween.

There, of course, are other combinations of varying gap widths and deflection or lateral movement which would be accommodated by the thermal/pressure seal of the present invention. The positions of FIGS. 4 through 8 have been shown merely to illustrate some of these conditions and illustrate the flexibility of the seal under various conditions. As has been shown, the thermal/pressure seal of the present invention provides a solution to a rather unique problem in space travel or for that matter in other high performance aircraft applications. While the seal is more complex than seals used in ordinary applications, it is relatively simple for the conditions which it is expected to encounter.

The seal of the present invention has been described for a particular spacecraft use. However, it is easily seen that it could be adapted for other applications where both a pressure seal and thermal barrier is desired between moving surfaces. Whereas the application of the preferred embodiment is described using a pair of such seal assemblies 10 and 110, these other applications may require a single seal assembly. Many variations of the invention can be made without departing from the spirit of the invention. Accordingly, it is intended that the scope of the invention be limited only by the claims which follow.

What is claimed is:

1. Apparatus for providing thermal and pressure sealing in an elongated space of varying width between adjacent surfaces of first and second members mounted for at least limited lateral movement therebetween, said apparatus comprising:
    a first elongated support member, having a surface which is at least partially concavely curved, attached to one of said first and second member adjacent surfaces;
    a second elongated support member attached to the other of said first and second member adjacent surfaces;
    an elongated seal member sandwiched between said support members which in its nondeformed state is substantially cylindrical but which is capable of deformation to accommodate varying widths of space and said limited lateral movement between said first and second members wherein said elongated seal member comprises a core of relatively low thermal conductivity and an outer covering of relatively high pressure resistance wherein said outer covering comprises a sheet of flexible material wrapped around said core but the ends of which extend together to form a flap portion for attaching said seal member to said first elongated support member; and
    an elongated tensioning rod disposed along the base of said flap portion on the opposite side thereof from said first support member.

2. Thermal and pressure sealing apparatus as set for in claim 1 in which the surface of said second support member against which said elongated seal member rests is provided with a reverse concave-convex curve.

* * * * *